Jan. 9, 1923. 1,441,487
R. DONER.
AUTOMOBILE SHADE.
FILED FEB. 7, 1921.
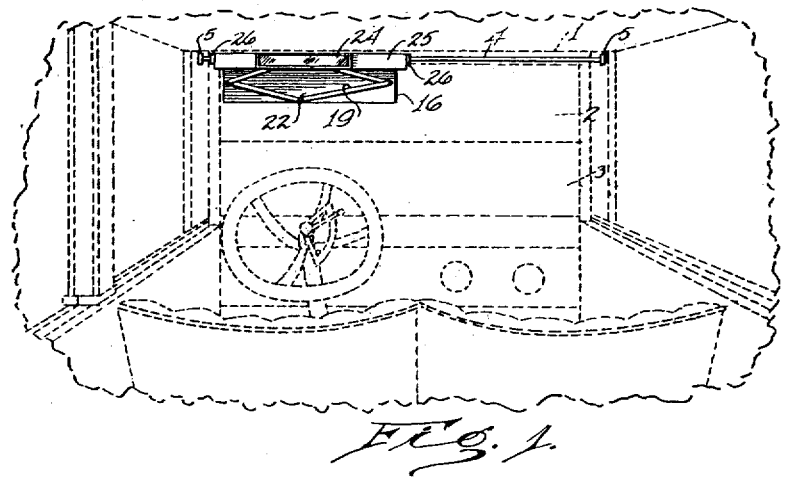
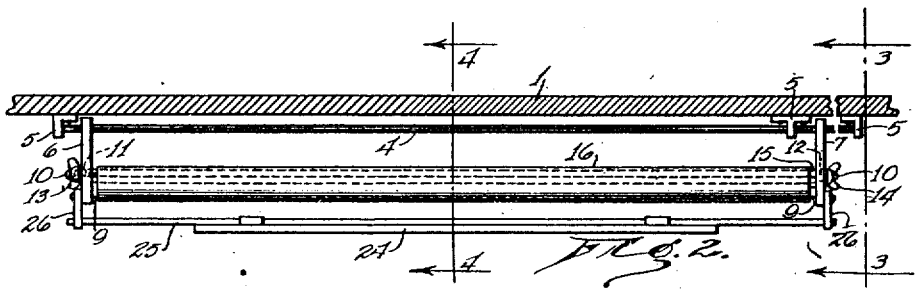
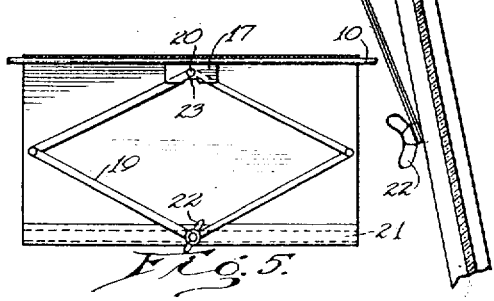
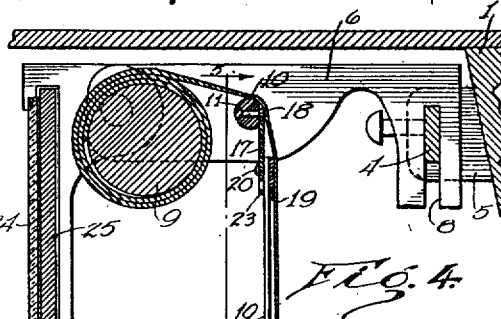
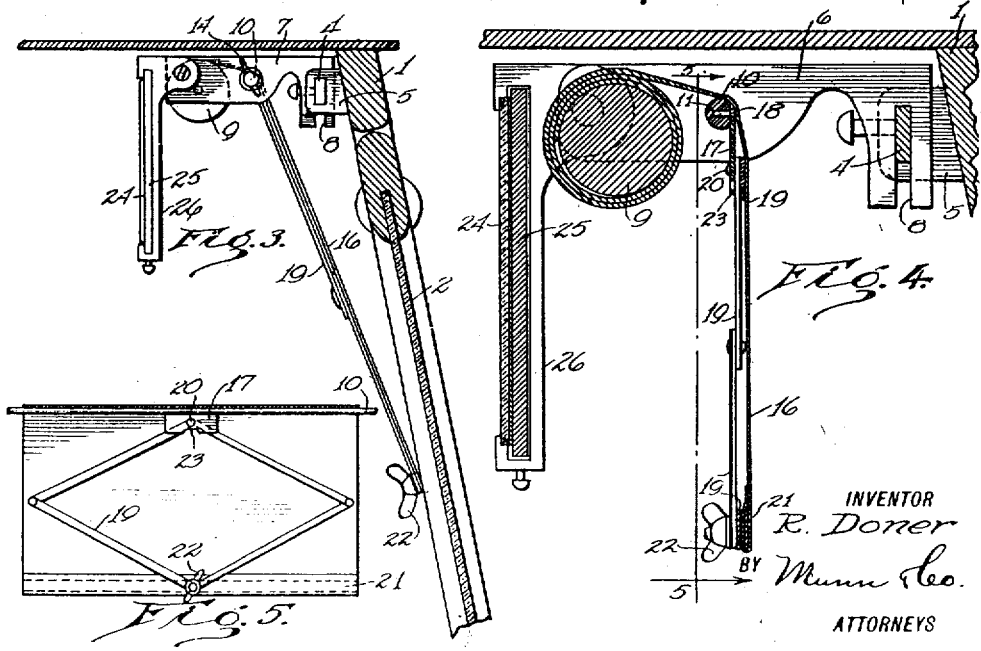
INVENTOR
R. Doner
BY Munn & Co.
ATTORNEYS Patented Jan. 9, 1923.

1,441,487

UNITED STATES PATENT OFFICE.

ROBERT DONER, OF CHICAGO, ILLINOIS.

AUTOMOBILE SHADE.

Application filed February 7, 1921. Serial No. 443,139.

*To all whom it may concern:*

Be it known that I, ROBERT DONER, a citizen of the United States, and a resident of Chicago, in the county of Cook and State of Illinois, have invented a new and useful Improvement in Automobile Shades, of which the following is a full, clear, and exact description.

My invention relates to improvements in automobile shades, and more particularly to that type of shade which is used on windshields to keep the sun's rays from striking the driver's eyes, and it consists in the combinations, constructions and arrangements herein described and claimed.

An object of my invention is to provide an automobile shade which can be instantly moved to any part of the wind-shield so as to intercept the sun's rays that would ordinarily strike the driver's eyes.

A further object of my invention is to provide an automobile shade which can be pulled down to any desired length and be secured in the adjusted position.

A further object of my invention is to provide an automobile shade that can be tilted or swung so as to be parallel with the plane of the wind-shield.

A further object of my invention is to provide an automobile shade having means whereby it is rigidly held, thereby preventing the shade from flapping.

A further object of my invention is to provide a device of the type described which is simple in construction and operation, has few moving parts and is not likely to easily get out of order.

Other objects and advantages will appear in the following specification, and the novel features of the invention will be particularly pointed out in the appended claims.

My invention is illustrated in the accompanying drawings, forming part of this application, in which Figure 1 is a side elevation of the device as shown attached to the wind-shield of an automobile, Figure 2 is a top plan view of the device, Figure 3 is a section along the line 3—3 of Figure 2.

Figure 4 is a section along the line 4—4 of Figure 2, and

Figure 5 is a section along the line 5—5 of Figure 4.

In carrying out my invention, I make use of an ordinary automobile preferably of the sedan type, and mount on the portion of the wind-shield frame 1, disposed above the swingable portion 2 of the wind-shield 3, a guide bar 4 which is secured thereto by any suitable means, such as brackets 5. I prefer to use three brackets, two of which are disposed at each end of the bar 4 and the third positioned midway between them.

Two arms 6 and 7, each having a slot 8 which is adapted to receive the bar 4 therein (see Figure 4), are slidably mounted on the bar and are rigidly secured to each other by means of a roller 9 and a rod 10. The rod 10 is disposed in alined holes 11 and 12 in the arms 6 and 7 respectively, and has its ends, which project from the arms, threaded and adapted to receive winged nuts 13 and 14 for a purpose hereafter described. The hole 11 is threaded and receives the threaded end portion of the rod 10, while the other end of the rod 10 has a nut 15 mounted thereon which is adapted to bear against the arm 7 (see Figure 2). The roller 9 is of the ordinary roller shade type and is adapted to receive a shade 16 which is wrapped therearound, the end of the shade being disposed over the rod 10 and hanging therefrom (see Figure 4).

The rod 10 has means cooperating therewith by which it rigidly holds the shade 16 in extended position, prevents it from flapping, and permits it to be tilted at any angle desired the means comprising a plate 17 secured to the rod by screws 18, and a collapsible frame 19 which is a parallelogram in shape and is pivotally secured to the plate 17 at 20 and to a rod 21 mounted in the free end of the shade 16 (see Figures 4 and 5). The frame 19 can be held in any of its adjusted positions by means of a thumb-screw 22 that rigidly clamps two adjacent arms of the frame together. A recess 23 is provided in the plate 17 for receiving the thumb-screw 22 when the shade is rolled up. The shade 16 can be tilted to any desired angle and there be firmly held by merely tightening the thumb-screws 13 and 14 which rigidly clamp the rod to the arms 6 and 7, thereby preventing the rotation of the rod 10 and consequently the swinging of the plate 17 and the frame 19 that supports the shade.

A mirror 24 is slidably mounted on a plate 25 which is secured by means of brackets 26 to the arms 6 and 7, whereby the driver is enabled to see an automobile that might be approaching from the rear.

The brackets 26 are pivotally secured to the arms 6 and 7 by screws 8 and are maintained at any angle with respect to the arms by frictional contact therewith.

From the foregoing description of the various parts of the device, the operation thereof may be readily understood. As will be seen from Figures 1 and 2, the shade is preferably made wide enough so as to cover half of the wind-shield. The bar 4, however, extends entirely across the top of the wind-shield, thus permitting the shade to be moved therealong and to cover any portion of the shield. After the shade has been moved to the desired position on the bar 4, it can be unrolled by merely grasping the thumb-screw 22 and pulling downwardly until the shade is at the desired length so as to intercept the sun's rays that would ordinarily strike the driver's eyes, whereupon the thumb-screw is tightened and holds the shade in rigid position.

When the movable portion 2 of the wind-shield is swung out, the shade can also be swung out in a manner heretofore described so as to lie flat against the glass. This prevents the shade from rattling due to the in-rushing air and the consequent strain thereupon.

As previously stated, the shade is prevented from flapping because it is securely fastened to the rigid frame 19.

The device is very simple in construction and operation, and can be manufactured at a low cost. When in inoperative position, the device is hidden from view and does not impair the appearance of the vehicle to which applied.

I claim:

1. The combination with an automobile having a wind-shield, of a bar horizontally disposed above said wind-shield, a shade carrying frame slidably mounted on said bar, said frame comprising a shade roller and a rod disposed parallel to said roller, a shade secured to said roller and being adapted to pass over said rod, a collapsible frame secured to said rod at one of its ends, and secured to the free end of said shade at its other end, and means for rigidly bracing said collapsible frame in any adjusted position.

2. The combination with an automobile having a wind-shield, of a bar carried by said automobile, a shade carrying frame carried by said bar, said frame comprising a shade roller and a rod disposed parallel to said roller, a shade secured to said roller and being adapted to pass over said rod, a collapsible frame secured to said rod at one of its ends, and secured to the free end of said shade at its other end, means for rigidly bracing said collapsible frame in any adjusted position, and means for securing said collapsible frame after it has been swung into the desired angle.

3. The combination with an automobile having a wind-shield, of a bar carried by said automobile, a frame carried by said bar, a shade mounted in said frame, a collapsible frame secured to said first named frame at one of its ends, and secured to the free end of said shade at its other end, means for bracing said collapsible frame in any adjusted position, and means for securing said collapsible frame after it has been swung into any desired angle.

4. The combination with an automobile having a wind-shield and a frame slidably mounted on said wind-shield, a shade roller mounted on said frame, a rod disposed parallel to said roller, a shade secured to said roller and adapted to pass over said rod, and a collapsible frame secured to said rod at one of its ends and secured to the free end of said shade at its other end.

ROBERT DONER.